United States Patent
Bruno

(10) Patent No.: US 9,614,613 B2
(45) Date of Patent: Apr. 4, 2017

(54) COMMUNICATION NETWORK ELEMENT AND METHOD OF MITIGATING AN OPTICAL JAMMING ATTACK AGAINST AN OPTICAL COMMUNICATION SYSTEM

(71) Applicant: Telefonaktiebolaget L M Ericsson (publ), Stockholm (SE)

(72) Inventor: Gianmarco Bruno, Genoa (IT)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 14/650,358

(22) PCT Filed: Dec. 12, 2012

(86) PCT No.: PCT/EP2012/075225
§ 371 (c)(1),
(2) Date: Jun. 8, 2015

(87) PCT Pub. No.: WO2014/090295
PCT Pub. Date: Jun. 19, 2014

(65) Prior Publication Data
US 2015/0318918 A1    Nov. 5, 2015

(51) Int. Cl.
*H04B 10/00* (2013.01)
*H04B 10/07* (2013.01)
(Continued)

(52) U.S. Cl.
CPC ......... *H04B 10/0705* (2013.01); *H04B 10/85* (2013.01); *H04K 3/228* (2013.01);
(Continued)

(58) Field of Classification Search
CPC ........ H04B 10/07951; H04B 10/07953; H04B 10/07955; H04B 10/07957; H04B 10/0797; H04B 10/0799
(Continued)

(56) References Cited

U.S. PATENT DOCUMENTS 5,581,640 A * 12/1996 Pan .................... G02F 1/093
                                                359/484.03
2005/0074195 A1* 4/2005 Chi ................ H04B 10/07955
                                                385/12
2010/0104283 A1* 4/2010 Mahlab .............. H04L 12/437
                                                398/58

FOREIGN PATENT DOCUMENTS

EP    1 059 518    12/2000
EP    1 126 635    8/2001
EP    1 246 377    10/2002

OTHER PUBLICATIONS

International Search Report for International application No. PCT/EP2012/075225, Aug. 16, 2013.
(Continued)

*Primary Examiner* — Daniel Dobson
(74) *Attorney, Agent, or Firm* — Baker Botts, LLP

(57) ABSTRACT

A communication network element (10) comprising: an optical path (12) for an optical communication signal (14); a monitoring port (16) arranged to output an optical monitoring signal; an optical splitter (20) provided in the optical path, the optical splitter arranged to receive the optical communication signal and to split off a part of the optical communication signal to form the optical monitoring signal; and optical isolation apparatus (22) connected between the optical splitter and the monitoring port, the optical isolation apparatus arranged to transmit the optical monitoring signal propagating towards the monitoring port and arranged to apply an attenuation, IA, to an attacking optical signal (24) propagating from the monitoring port towards the optical splitter to thereby prevent a substantial part of the attacking optical signal being transmitted to the optical path.

13 Claims, 9 Drawing Sheets

(51) Int. Cl.
| | |
|---|---|
| *H04Q 11/00* | (2006.01) |
| *H04B 10/85* | (2013.01) |
| *H04K 3/00* | (2006.01) |
| *H04J 14/00* | (2006.01) |

(52) U.S. Cl.
CPC ..... *H04Q 11/0005* (2013.01); *H04Q 11/0062* (2013.01); *H04K 2203/14* (2013.01); *H04Q 2011/0049* (2013.01); *H04Q 2011/0083* (2013.01)

(58) Field of Classification Search
USPC .......................................................... 398/38
See application file for complete search history.

(56) References Cited

OTHER PUBLICATIONS

"Attack Detection in All-Optical Networks" by Muriel Medard et al., 1998.
"Limiting the Propagation of Intra-channel Crosstalk Attacks in Optical Networks through Wavelength Assignment" by Nina Skorin-Kapov et al., 2009.
"Propagation Effect of High-powered Jamming Attack in Transparent Optical Networks" by Sun Zeyu et al., 2011.
Series G: Transmission Systems and Media, Digital Systems and Networks; Transmission media and optical systems characteristics—Characteristics of optical systems; Optical monitoring for dense wavelength division multiplexing systems; ITU-T; Telecommunication Standardization Sector of ITU (G-697), Feb. 2012.
Series X: Data Networks and Open System Communications; Security; Security architecture for systems providing end-to-end communications; ITU-T Recommendation X.805, Oct. 2003.

\* cited by examiner

COMMUNICATION NETWORK ELEMENT AND METHOD OF MITIGATING AN OPTICAL JAMMING ATTACK AGAINST AN OPTICAL COMMUNICATION SYSTEM

PRIORITY

This nonprovisional application is a U.S. National Stage Filing under 35 U.S.C. §371 of International Patent Application Serial No. PCT/EP2012/075225, filed Dec. 12, 2012, and entitled "Communication Network Element and Method of Mitigating an Optical Jamming Attack Against an Optical Communication Signal."

TECHNICAL FIELD

The invention relates to a communication network element. The invention relates to a communication network comprising the communication network element. The invention further relates to a method of mitigating an optical jamming attack against an optical communication signal through an optical monitoring port of a communication network element. The method further relates to a method of manufacturing a communication network element.

BACKGROUND

Optical communication systems are capable of transmitting optical communication signals thousands of kilometers without electrical terminations or regeneration. For this reason, optical monitoring points are available at each network element, usually at its input and output, in order to perform measurements like optical signal to noise ratio, OSNR, power, frequencies for maintenance, automatic performance reporting, etc., as required by ITU-T Recommendation G.697. It is possible to exploit optical monitoring points to access the optical signal of interest and mess it up with broadband or frequency selective optical noise. Monitoring points comprise an optical splitter that splits off a certain portion of the optical signal, typically in the range of 1% to 10%, to form an optical monitoring signal, which are typically then delivered to a monitoring port of the network element, which can be connected to an optical spectrum analyser to perform the measurements indicated above, or to an internal photodiode for power measurement.

Optical communication signals transported by the optical communication system can be accessed through a monitoring point of the first kind and this poses a security problem because the communication signal is susceptible to an optical jamming attack. Optical jamming is a known technique to disrupt an optical communication signal in which broadband or narrowband optical signals, such as noise or tones, are inserted into the optical communication system to intentionally deteriorate optical communication signals carrying traffic. This can be done by using optical monitoring ports as inputs for the attacking optical signal. Forms of optical jamming include causing intra-channel cross-talk, which uses an attacking optical signal at the same frequency as the optical signal to be disrupted, and inter-channel cross-talk, which uses an attacking signal at a different frequency, and causing gain competition, which uses a higher-powered attacking signal to deplete the optical power assigned to weaker optical communication signals on different wavelengths.

The problem of making optical monitoring apparatus secure against attacks by optical jamming has attracted some interest in the technical literature due to the continuous trend to extend the application of optical technologies towards the end user. The proposed solutions assume that an optical jamming attack will take place in some way and propose ways to detect that it is happening or to mitigate it. For example, a wavelength allocation scheme to mitigate the effect of an inter-channel optical jamming attack by limiting its maximal propagation in an optical domain is reported by N. Skorin-Kapov et al, "Limiting the propagation of intra-channel crosstalk attacks in optical networks through wavelength assignment", Optical Fiber Communication Conference 2009, JWA65.

SUMMARY

It is an object to provide an improved communication network element. It is a further object to provide an improved communication network comprising the communication network element. It is a further object to provide an improved method of mitigating an optical jamming attack against an optical communication signal through an optical monitoring port of a communication network element. It is a further object to provide an improved method of manufacturing a communication network element.

A first aspect of the invention provides a communication network element comprising an optical path for an optical communication signal, a monitoring port, an optical splitter and optical isolation apparatus. The monitoring port is arranged to output an optical monitoring signal. The optical splitter is provided in the optical path. The optical splitter is arranged to receive the optical communication signal and to split off a part of the optical communication signal to form the optical monitoring signal. The optical isolation apparatus is connected between the optical splitter and the monitoring port. The optical isolation apparatus is arranged to transmit the optical monitoring signal propagating towards the monitoring port. The optical isolation apparatus is arranged to apply an attenuation, IA, to an attacking optical signal propagating from the monitoring port towards the optical splitter to thereby prevent a substantial part of the attacking optical signal being transmitted to the optical path.

The communication network element may enable optical signal monitoring while mitigating an optical jamming attack through an optical monitoring port. This may mitigate denial of authorised access to network elements, stored information, information flows, services and applications due to events impacting the network, as required by ITU-T X.805 "Security architecture for systems providing end-to-end communications". This may also ensure accurate transmission of optical signals between network elements with the planned availability, as also required by ITU-T X.805. The communication network element may increase the security of a communication network by making the optical monitoring ports secure against optical jamming attacks hence increasing transmission integrity and availability. The communication network element may be used with optical communication signals having any modulation format and bit-rate, for example from 10, to 100 Gbit/s and more.

Rather than simply accepting that optical jamming attacks will take place and configuring a network to mitigate the effects of an attack, the communication network element may enable a network operator to substantially prevent an optical jamming attack by preventing a substantial part of the attacking optical signal reaching the optical path and the optical communication signals being transmitted along the path. This may reduce the resources which a network operator needs to allocate to mitigating the effects of an optical jamming attack.

In an embodiment, the optical communication signal has an optical signal power, S, and is configured to tolerate a maximum cross-talk, XT. The optical splitter has a splitter attenuation, SA, in a direction through the splitter from the monitoring port towards the optical path. The attacking optical signal has an optical signal power, PJ. The attenuation of the optical isolation apparatus is given as IA≥PJ−S−SA+XT, where the optical signal powers, S and PJ, are expressed in dBm and the attenuations, IA and SA, and the cross-talk, XT, are expressed in dB. The isolation apparatus attenuation, IA, applied to the attacking optical signal may be set according to the optical communication signal power, maximum crosstalk and splitter attenuation, which will be known to a network operator, and according to an anticipated attacking optical signal power. The attenuation may therefore be set at a level at which the power of the attacking optical signal required to produce a cross-talk greater than the tolerable maximum, XT, would physically damage the optical monitoring port and the optical isolation apparatus.

In an embodiment, the optical path comprises an optical reflection element before the optical splitter in a direction of transmission of the optical communication signal. The optical reflection element has a return loss, RL. The attenuation of the optical isolation apparatus is given as IA≥PJ−S−SA−RL+XT, where the return loss is expressed in dB. The setting of the isolation apparatus attenuation may also take account of a known return loss. The communication network element may therefore mitigate optical jamming attacks both when the attacking optical signal is intended to co-propagate with the optical communication signal and when the attacking optical signal is intended to counter-propagate with the optical communication signal.

In an embodiment, the optical reflection element is an optical connector.

In an embodiment, the optical isolation apparatus attenuation, IA, is at least 30 dB.

In an embodiment, the optical isolation apparatus comprises one of an optical isolator and an optical circulator.

In an embodiment, the optical isolation apparatus comprises an optical circulator and a photodetector configured to detect the presence of the attacking optical signal. The optical circulator comprises three input-output ports, a first port being connected to the optical splitter, a second port being connected to the monitoring port and a third port being connected to the photodetector. An optical signal received at the first port is output at the second port and an optical signal received at the second port is output at the third port. The photodetector is configured to generate and transmit an alarm signal following detection of the attacking optical signal. The communication network element may detect the presence of an attacking optical signal delivered into the monitoring port and alert a network operator that an attack has been attempted. This may enable a network operator to send an engineer to physically inspect and repair the communication network element.

In an embodiment, the optical path comprises at least two of an input port, an output port and optical signal processing apparatus. The optical splitter is provided between two of the input port, the output port and the optical signal processing apparatus. The communication network element may be configured with an optical splitter on either or both of the input side and the output side of an optical signal processing element, or with an optical splitter on a pass-through optical path.

In an embodiment, the optical signal processing apparatus comprises one of an optical amplifier, an optical leveller, a switch, a router, optical dispersion compensation apparatus, an optical multiplexer and an optical demultiplexer.

In an embodiment, the optical splitter is arranged to split of between 1 percent and 10 percent of the optical communication signal to form the optical monitoring signal.

In an embodiment, the optical communication signal is a wavelength division multiplexed optical communication signal comprising a plurality of optical communication signals at a plurality of different wavelengths. The communication network element may be used to mitigate optical jamming attacks against the whole WDM signal.

In an embodiment, the attacking optical signal is a broad bandwidth optical signal. The communications network element may prevent intra-band and inter-band cross-talk and gain competition based optical jamming attacks.

In an embodiment, the attacking optical signal has a wavelength substantially matching one of the wavelengths of the wavelength division multiplexed optical communication signal. The communications network element may prevent intra-band and gain competition based optical jamming attacks.

In an embodiment, the optical communication network element is an optical communication network node.

In an embodiment, the optical communication network element is an optical card for an optical communication network node.

A second aspect of the invention provides a communication network comprising an optical link and a communication network element. The communication network element comprises an optical path for an optical communication signal, a monitoring port, an optical splitter and optical isolation apparatus. The monitoring port is arranged to output an optical monitoring signal. The optical splitter is provided in the optical path. The optical splitter is arranged to receive the optical communication signal and to split off a part of the optical communication signal to form the optical monitoring signal. The optical isolation apparatus is connected between the optical splitter and the monitoring port. The optical isolation apparatus is arranged to transmit the optical monitoring signal propagating towards the monitoring port. The optical isolation apparatus is arranged to apply an attenuation, IA, to an attacking optical signal propagating from the monitoring port towards the optical splitter to thereby prevent a substantial part of the attacking optical signal being transmitted to the optical path.

The communication network element may enable optical signal monitoring while mitigating an optical jamming attack through an optical monitoring port. This may mitigate denial of authorised access to network elements, stored information, information flows, services and applications due to events impacting the network, as required by ITU-T X.805 "Security architecture for systems providing end-to-end communications". This may also ensure accurate transmission of optical signals between network elements with the planned availability, as also required by ITU-T X.805. The communication network element may increase the security of a communication network by making the optical monitoring ports secure against optical jamming attacks hence increasing transmission integrity and availability. The communication network element may be used with optical communication signals having any modulation format and bit-rate, for example from 10, to 100 Gbit/s and more.

Rather than simply accepting that optical jamming attacks will take place and configuring the network to mitigate the effects of an attack, the communication network element may enable a network operator to substantially prevent an optical jamming attack by preventing a substantial part of the attacking optical signal reaching the optical path and the optical communication signals being transmitted along the path. This may reduce the resources which a network operator needs to allocate to mitigating the effects of an optical jamming attack.

In an embodiment, the optical communication signal has an optical signal power, S, and is configured to tolerate a maximum cross-talk, XT. The optical splitter has a splitter attenuation, SA, in a direction through the splitter from the monitoring port towards the optical path. The attacking optical signal has an optical signal power, PJ. The attenuation of the optical isolation apparatus is given as IA≥PJ−S−SA+XT, where the optical signal powers, S and PJ, are expressed in dBm and the attenuations, IA and SA, and the cross-talk, XT, are expressed in dB. The isolation apparatus attenuation, IA, applied to the attacking optical signal may be set according to the optical communication signal power, maximum crosstalk and splitter attenuation, which will be known to a network operator, and according to an anticipated attacking optical signal power. The attenuation may therefore be set at a level at which the power of the attacking optical signal required to produce a cross-talk greater than the tolerable maximum, XT, would physically damage the optical monitoring port and the optical isolation apparatus.

In an embodiment, the optical path comprises an optical reflection element before the optical splitter in a direction of transmission of the optical communication signal. The optical reflection element has a return loss, RL. The attenuation of the optical isolation apparatus is given as IA≥PJ−S−SA−RL+XT, where the return loss is expressed in dB. The setting of the isolation apparatus attenuation may also take account of a known return loss. The communication network element may therefore mitigate optical jamming attacks both when the attacking optical signal is intended to co-propagate with the optical communication signal and when the attacking optical signal is intended to counter-propagate with the optical communication signal.

In an embodiment, the optical reflection element is an optical connector.

In an embodiment, the optical isolation apparatus attenuation, IA, is at least 30 dB.

In an embodiment, the optical isolation apparatus comprises one of an optical isolator and an optical circulator.

In an embodiment, the optical isolation apparatus comprises an optical circulator and a photodetector configured to detect the presence of the attacking optical signal. The optical circulator comprises three input-output ports, a first port being connected to the optical splitter, a second port being connected to the monitoring port and a third port being connected to the photodetector. An optical signal received at the first port is output at the second port and an optical signal received at the second port is output at the third port. The photodetector is configured to generate and transmit an alarm signal following detection of the attacking optical signal. The communication network element may detect the presence of an attacking optical signal delivered into the monitoring port and alert a network operator that an attack has been attempted. This may enable a network operator to send an engineer to physically inspect and repair the communication network element.

In an embodiment, the optical path comprises at least two of an input port, an output port and optical signal processing apparatus. The optical splitter is provided between two of the input port, the output port and the optical signal processing apparatus. The communication network element may be configured with an optical splitter on either or both of the input side and the output side of an optical signal processing element, or with an optical splitter on a pass-through optical path.

In an embodiment, the optical signal processing apparatus comprises one of an optical amplifier, an optical leveller, a switch, a router, optical dispersion compensation apparatus, an optical multiplexer and an optical demultiplexer.

In an embodiment, the optical splitter is arranged to split of between 1 percent and 10 percent of the optical communication signal to form the optical monitoring signal.

In an embodiment, the optical communication signal is a wavelength division multiplexed optical communication signal comprising a plurality of optical communication signals at a plurality of different wavelengths. The communication network element may be used to mitigate optical jamming attacks against the whole WDM signal.

In an embodiment, the attacking optical signal is a broad bandwidth optical signal. The communications network element may prevent intra-band and inter-band cross-talk and gain competition based optical jamming attacks.

In an embodiment, the attacking optical signal has a wavelength substantially matching one of the wavelengths of the wavelength division multiplexed optical communication signal. The communications network element may prevent intra-band and gain competition based optical jamming attacks.

In an embodiment, the optical communication network element is an optical communication network node.

In an embodiment, the optical communication network element is an optical card for an optical communication network node.

A third aspect of the invention provides a method of mitigating an optical jamming attack against an optical communication signal through an optical monitoring port of a communication network element. The method comprises receiving an attacking optical signal from the monitoring port and applying an attenuation, IA, to the attacking optical signal to thereby prevent a substantial part of the attacking optical signal propagating with the optical communication signal.

The method may enable optical signal monitoring to be implemented while mitigating an optical jamming attack through an optical monitoring port. This may mitigate denial of authorised access to network elements, stored information, information flows, services and applications due to events impacting the network, as required by ITU-T X.805 "Security architecture for systems providing end-to-end communications". This may also ensure accurate transmission of optical signals between network elements with the planned availability, as also required by ITU-T X.805. The method may increase the security of a communication network by making the optical monitoring ports secure against optical jamming attacks hence increasing transmission integrity and availability. The method may be used with optical communication signals having any modulation format and bit-rate, for example from 10, to 100 Gbit/s and more.

Rather than simply accepting that optical jamming attacks will take place and configuring a network to mitigate the effects of an attack, the method may enable a network operator to substantially prevent an optical jamming attack by preventing a substantial part of the attacking optical signal reaching the optical path and the optical communication signals being transmitted along the path. This may reduce the resources which a network operator needs to allocate to mitigating the effects of an optical jamming attack.

In an embodiment, the optical communication signal has an optical signal power, S, and is configured to tolerate a maximum cross-talk, XT. The communication network element comprises an optical splitter having a splitter attenuation, SA, in a direction through the splitter from the monitoring port towards the optical path. The attacking optical signal has an optical signal power, PJ. The method comprises applying an attenuation IA≥PJ−S−SA+XT, where the optical signal powers, S and PJ, are expressed in dBm and the attenuations, IA and SA, and the cross-talk, XT, are expressed in dB. The attenuation, IA, applied to the attacking optical signal may be set according to the optical communication signal power, maximum crosstalk and splitter attenuation, which will be known to a network operator, and according to an anticipated attacking optical signal power. The attenuation may therefore be set at a level at which the power of the attacking optical signal required to produce a cross-talk greater than the tolerable maximum, XT, would physically damage the optical monitoring port and the optical isolation apparatus.

In an embodiment, the communication network element comprises an optical reflection element before the optical splitter in a direction of transmission of the optical communication signal. The optical reflection element has a return loss, RL. The method comprises applying an attenuation IA≥PJ−S−SA−RL+XT, where the return loss is expressed in dB. The attenuation may be set also take account of a known return loss. The method may therefore mitigate optical jamming attacks both when the attacking optical signal is intended to co-propagate with the optical communication signal and when the attacking optical signal is intended to counter-propagate with the optical communication signal.

In an embodiment, the optical reflection element is an optical connector.

In an embodiment, the attenuation, IA, is at least 30 dB.

In an embodiment, the method further comprises detecting the presence of the attacking optical signal and generating and transmitting an alarm signal following detection of the attacking optical signal. This may enable a network operator to be alerted that an attack has been attempted, which may enable a network operator to send an engineer to physically inspect and repair the communication network element.

In an embodiment, the optical splitter is arranged to split of between 1 percent and 10 percent of the optical communication signal to form the optical monitoring signal.

In an embodiment, the optical communication signal is a wavelength division multiplexed optical communication signal comprising a plurality of optical communication signals at a plurality of different wavelengths. The method may be used to mitigate optical jamming attacks against the whole WDM signal.

In an embodiment, the attacking optical signal is a broad bandwidth optical signal. The method may prevent intra-band and inter-band cross-talk and gain competition based optical jamming attacks.

In an embodiment, the attacking optical signal has a wavelength substantially matching one of the wavelengths of the wavelength division multiplexed optical communication signal. The method may prevent intra-band cross-talk and gain competition based optical jamming attacks.

In an embodiment, the optical communication network element is an optical communication network node.

In an embodiment, the optical communication network element is an optical card for an optical communication network node.

A fourth aspect of the invention provides a data carrier having computer readable instructions embodied therein, the computer readable instructions being for providing access to resources available on a processor. The computer readable instructions comprise instructions to cause the processor to perform any of the above steps of the method of mitigating an optical jamming attack against an optical communication signal through an optical monitoring port of a communication network element.

In an embodiment, the data carrier is a non-transitory data carrier.

A fifth aspect of the invention provides a method of manufacturing a communication network element. The method comprises providing an optical path for an optical communication signal. The method comprises providing a monitoring port arranged to output an optical monitoring signal. The method comprises providing an optical splitter in the optical path, and arranging the optical splitter to receive the optical communication signal and to split off a part of the optical communication signal to form the optical monitoring signal. The method comprises connecting optical isolation apparatus between the optical splitter and the monitoring port. The method comprises arranging the optical isolation apparatus to transmit the optical monitoring signal propagating towards the monitoring port and arranging the optical isolation apparatus to apply an attenuation, IA, to an attacking optical signal propagating from the monitoring port towards the optical splitter to thereby prevent a substantial part of the attacking optical signal being transmitted to the optical path.

The communication network element manufactured according to the method may enable optical signal monitoring while mitigating an optical jamming attack through an optical monitoring port. This may enable mitigation of denial of authorised access to network elements, stored information, information flows, services and applications due to events impacting the network, as required by ITU-T X.805 "Security architecture for systems providing end-to-end communications". This may also enable accurate transmission of optical signals between network elements with the planned availability, as also required by ITU-T X.805. The communication network element may increase the security of a communication network by making the optical monitoring ports secure against optical jamming attacks hence increasing transmission integrity and availability. The communication network element may be used with optical communication signals having any modulation format and bit-rate, for example from 10, to 100 Gbit/s and more.

Embodiments of the invention will now be described, by way of example only, with reference to the accompanying drawings.

DETAILED DESCRIPTION

Figure 1:
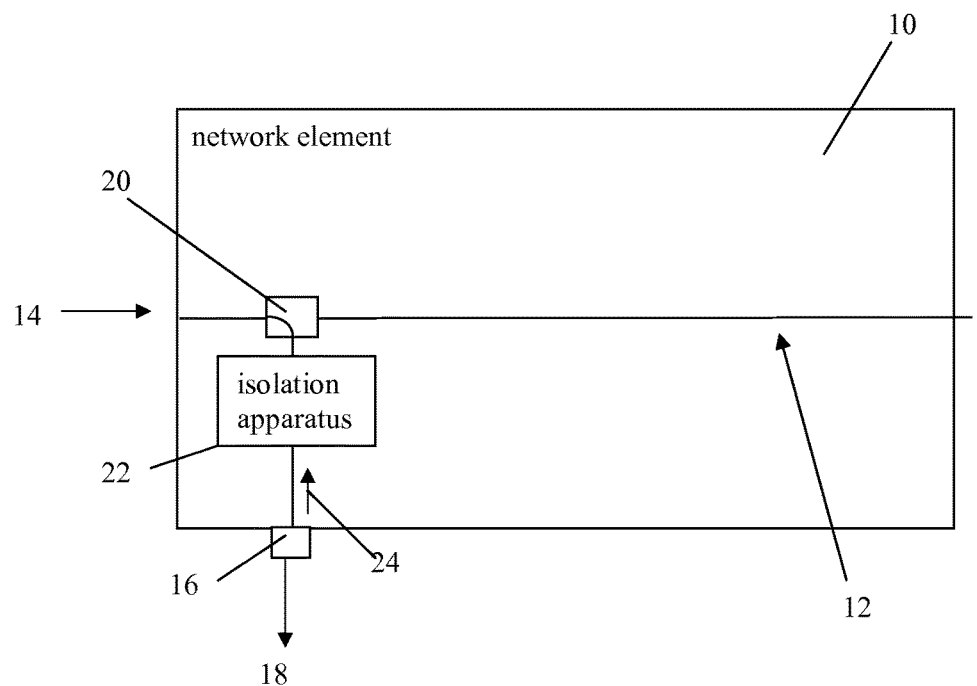
FIG. 1 is a schematic representation of a communication network element according to a first embodiment of the invention.

Referring to FIG. 1, a first embodiment of the invention provides a communication network element 10 comprising an optical path 12 for an optical communication signal 14, a monitoring port 16, an optical splitter 20 and optical isolation apparatus 22 connected between the optical splitter and the optical monitoring port.

The monitoring port 16 is arranged to output an optical monitoring signal 18.

The optical splitter 20 is provided in the optical path. The optical splitter is arranged to receive the optical communication signal and to split off a part of the optical communication signal to form the optical monitoring signal.

The optical isolation apparatus 22 is arranged to transmit the optical monitoring signal propagating towards the monitoring port 16. The optical isolation apparatus 22 is arranged to apply an attenuation, IA, to an attacking optical signal 24. The attacking optical signal 24 is injected into the optical monitoring port 16 and propagates from the monitoring port towards the optical splitter 20. The attenuation applied by the optical isolation apparatus prevents a substantial part of the attacking optical signal being transmitted to the optical path 12.

As will be appreciated by the person skilled in the art, an optical isolation apparatus configured to allow transmission of an optical signal in one direction and to attenuate an optical signal transmitted in the reverse direction is not able to entirely block transmission in the reverse direction. Therefore, while a substantial part of an optical signal transmitted in the reverse direction will be blocked, a small part of it will be transmitted. The optical isolation apparatus 22 is arranged to apply an attenuation which ensures that the small part of the attacking optical signal which is transmitted towards the optical splitter has an optical signal power which, when the attacking optical signal is propagating in the optical path, is too small to cause optical jamming of the optical communication signal.

A second embodiment of the invention provides a communication network element having the same structure as shown in FIG. 1, with the following modifications. The communication network element of this embodiment will be described with reference to FIG. 1.

In this embodiment, the optical communication signal 14 has an optical signal power, S, and is configured to tolerate a maximum cross-talk, XT. The optical splitter 20 has a splitter attenuation, SA, in a direction through the splitter from the monitoring port 16 towards the optical path 12. The attacking optical signal has an optical signal power, PJ.

In order to prevent a substantial part of the attacking optical signal being transmitted to the optical path 12 the optical isolation apparatus 22 is arranged to have an attenuation IA≥PJ−S−SA+XT.

As is usual in the art, the optical signal powers, S and PJ, are expressed in dBm and the attenuations, IA and SA, and the cross-talk, XT, are expressed in dB. The use of dB to express attenuations and dBm to express optical signal powers are routinely used in the art and will be well known by the person skilled in the art but a brief summary is set out below.

The decibel, dB, is used to express relative differences in signal strength. It is expressed as the base 10 logarithm of the ratio of the powers, P1 and P2, of two signals:

$$dB = 10 \log(P1/P2)$$

Optical attenuations can be expressed in dB as the ratio of the optical signal power after attenuation, P1, and before attenuation, P2. For example, a 3 dB attenuation means that 0.5 of the input signal power survives following attenuation. Optical signal powers can be expressed in dBm, which defines the optical signal power, P1, relative to a 1 mW reference level, P2. For example, a 2 mW optical signal power is expressed as 3 dBm.

Adding dB values is the same as multiplying regular numbers. For example, if you add 10 dB to a decibel value it is the same as multiplying it by 10. Subtracting one dB value from another is the same as dividing one regular number with another. For example, if you subtract 3 dB from a decibel value it is the same as dividing it by 2. Subtracting a dB value from a dBm value is the same as starting with an input power level and dividing it by an attenuation, with the resulting attenuated signal power being given in dBm. For example, a 1 mW signal power is expressed as 0 dBm and subtracting 10 dB attenuation will result in a signal power of −10 dBm, which is 0.1 mW.

The optical isolation apparatus 22 of this embodiment is arranged to apply an attenuation, IA, which ensures that the small part of the attacking optical signal which is transmitted towards the optical splitter has an optical signal power which, when the attacking optical signal is propagating in the optical path, is too small to cause cross-talk above the maximum tolerable cross-talk, XT, in the optical communication signal.

Figure 2:
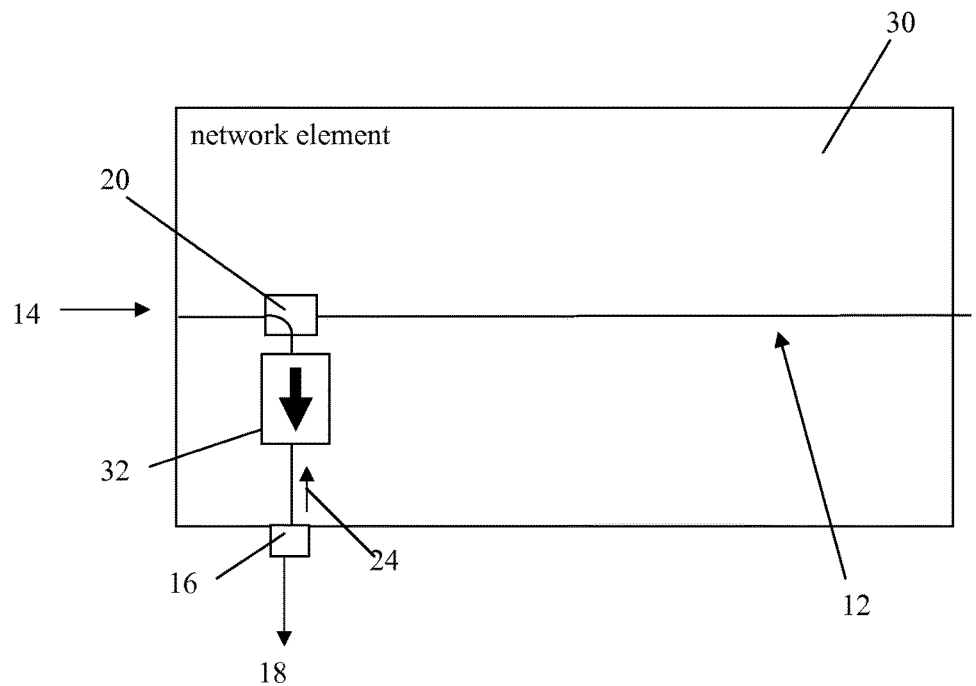
FIG. 2 is a schematic representation of a communication network element according to a third embodiment of the invention.

FIG. 2 shows an communication network element 30 according to a third embodiment of the invention. The network element 30 of this embodiment is similar to the network element 10 according to the first or second embodiment, with the following modifications. The same reference numbers are retained for corresponding features.

In this embodiment, the optical isolation apparatus comprises an optical isolator 32.

Figure 3:
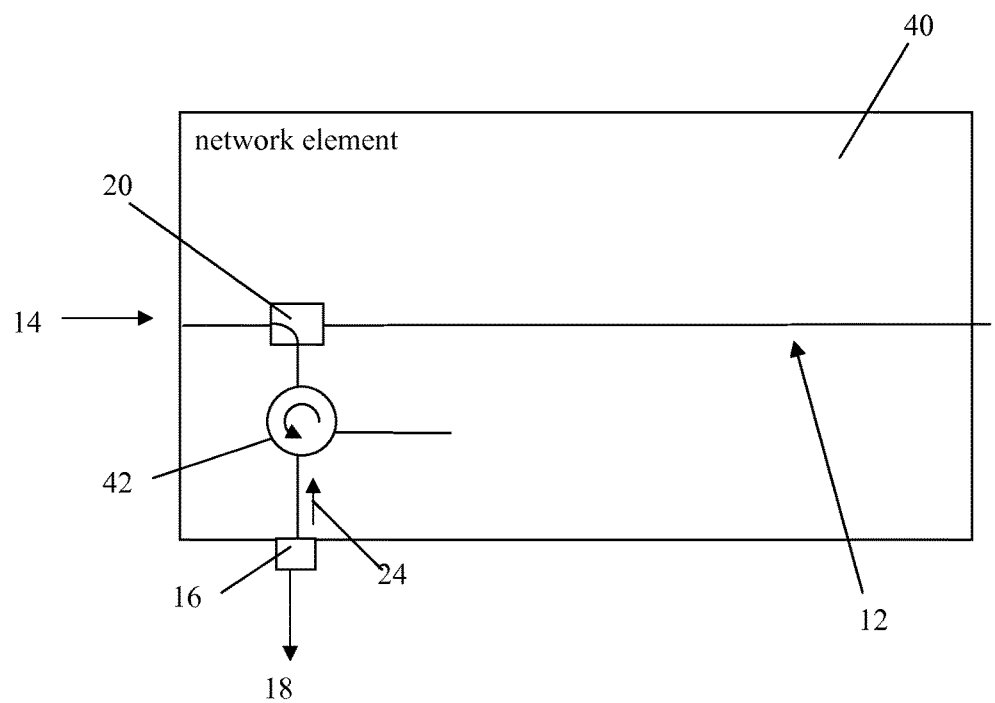
FIG. 3 is a schematic representation of a communication network element according to a fourth embodiment of the invention.

FIG. 3 shows an communication network element 40 according to a fourth embodiment of the invention. The network element 40 of this embodiment is similar to the network element 10 according to the first or second embodiment, with the following modifications. The same reference numbers are retained for corresponding features.

In this embodiment, the optical isolation apparatus comprises an optical circulator 42.

Figure 4:
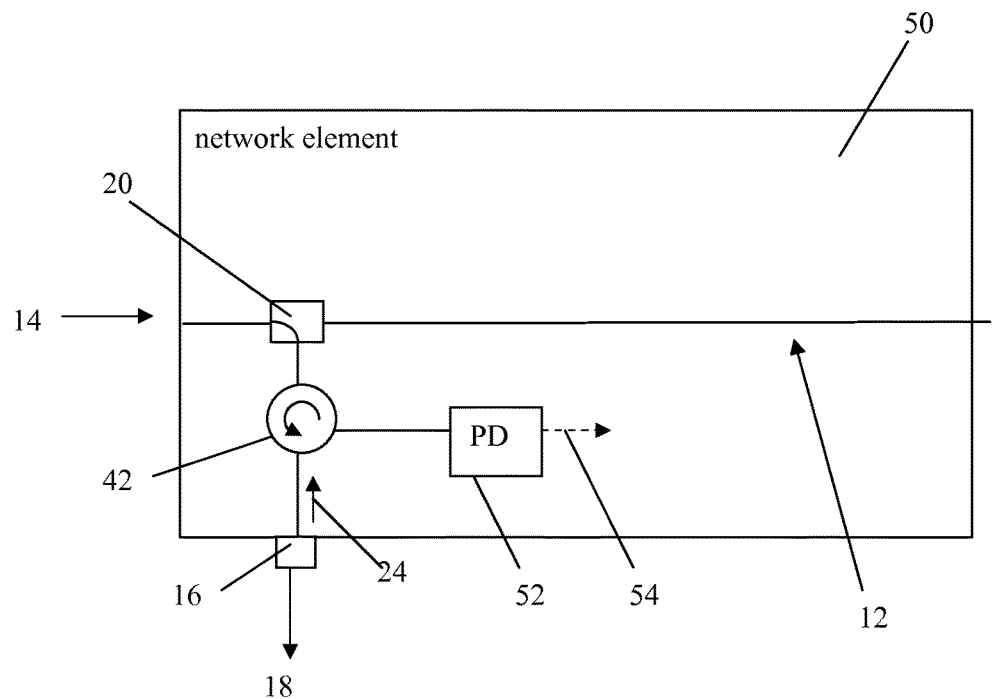
FIG. 4 is a schematic representation of a communication network element according to a fifth embodiment of the invention.

FIG. 4 shows an communication network element 50 according to a fifth embodiment of the invention. The network element 50 of this embodiment is similar to the network element 40 of FIG. 3, with the following modifications. The same reference numbers are retained for corresponding features.

In this embodiment, the optical isolation apparatus comprises an optical circulator 42 and a photodetector 52.

The optical circulator comprises three input-output ports. A first port is connected to the optical splitter 20. A second port is connected to the monitoring port 16. A third port is connected to the photodetector. An optical signal received at the first port is output at the second port and an optical signal received at the second port is output at the third port.

The photodetector 52 is configured to detect the presence of an attacking optical signal, received at the second port and routed via the third port to the photodetector. The photodetector is configured to generate and transmit an alarm signal 54 following detection of the attacking optical signal.

Figure 5:
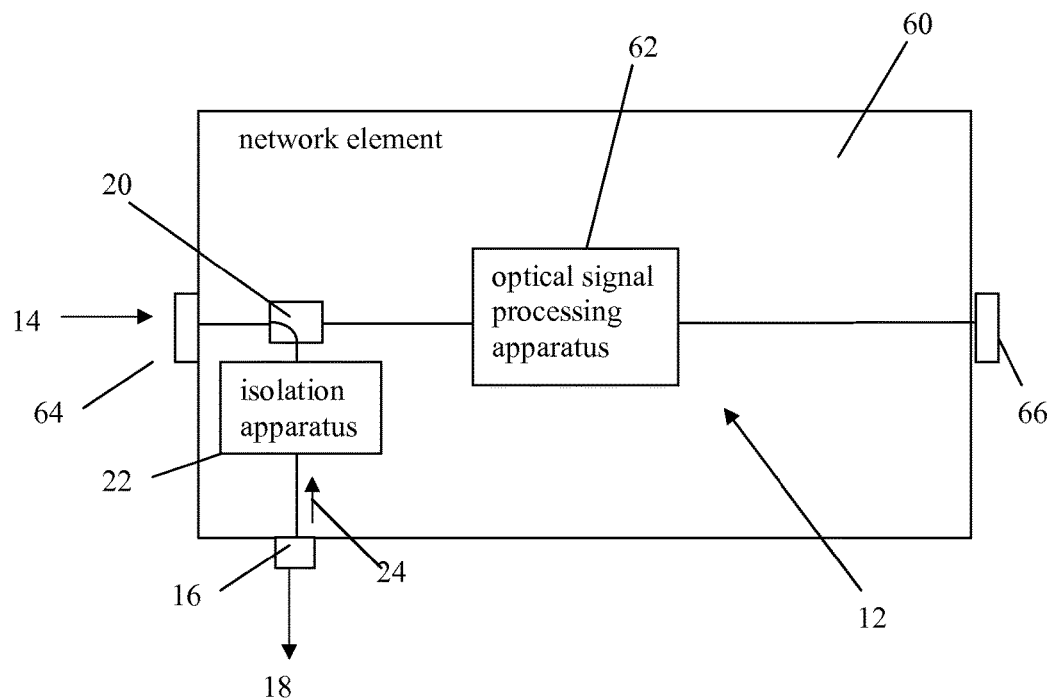
FIG. 5 is a schematic representation of a communication network element according to a sixth embodiment of the invention.

FIG. 5 shows an communication network element 60 according to a sixth embodiment of the invention. The network element 60 of this embodiment is similar to the network element 10 of FIG. 1, with the following modifications. The same reference numbers are retained for corresponding features.

In this embodiment, the network element comprises optical signal processing apparatus 62, an input port 64 and an output port 66. The optical splitter 20 is provided between the input port and the optical signal processing apparatus, for monitoring an optical communication signal being delivered to the optical signal processing apparatus. The optical signal processing apparatus may for example be one of an optical amplifier, an optical leveller, a switch, a router, optical dispersion compensation apparatus, an optical multiplexer and an optical demultiplexer.

The optical isolation apparatus 22 in therefore arranged to mitigate an optical jamming attack on an optical communication signal being delivered to the optical signal processing apparatus.

Figure 6:
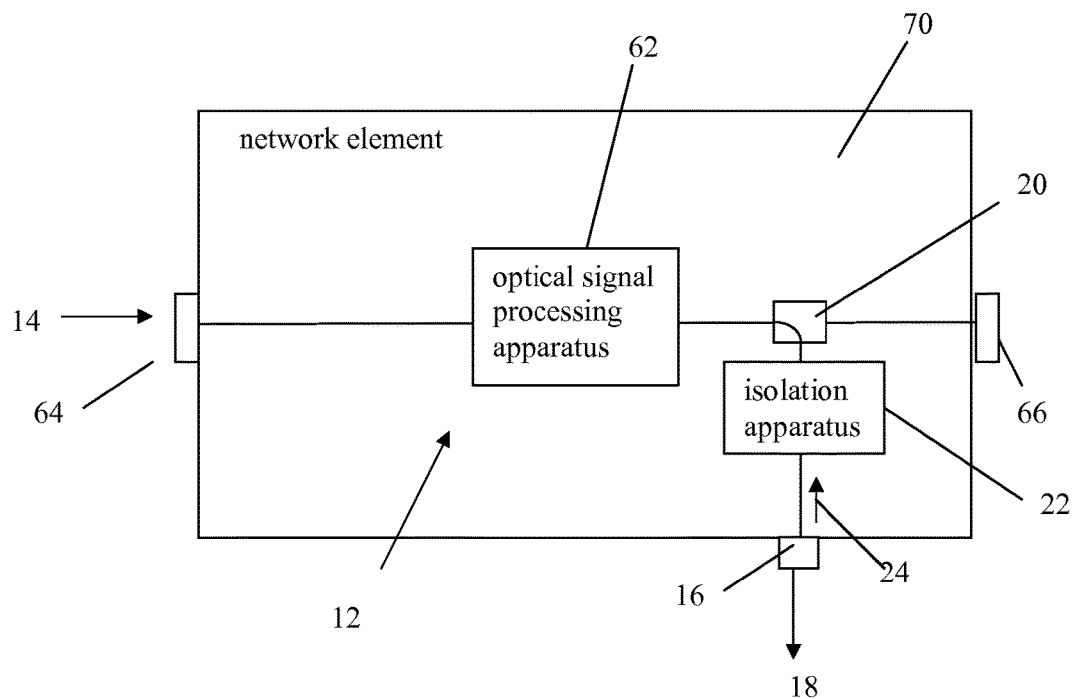
FIG. 6 is a schematic representation of a communication network element according to a seventh embodiment of the invention.

FIG. 6 shows an communication network element 70 according to a seventh embodiment of the invention. The network element 70 of this embodiment is similar to the network element 60 of FIG. 5, with the following modifications. The same reference numbers are retained for corresponding features.

In this embodiment, the optical splitter 20 is provided between the optical signal processing apparatus 62 and the output port 66, for monitoring an optical communication signal output from the optical signal processing apparatus. The optical isolation apparatus 22 in therefore arranged to mitigate an optical jamming attack on an optical communication signal following processing by the optical signal processing apparatus.

An eighth embodiment of the invention provides a communication network element having the same structure as shown in FIG. 5 or FIG. 6, with the following modifications. The communication network element of this embodiment will be described with reference to those Figures.

In this embodiment, the input port 64 is an input optical connector which will act as an optical reflector, and will therefore have a return loss, RL.

As described above in the second embodiment, the optical communication signal 14 has an optical signal power, S, and is configured to tolerate a maximum cross-talk, XT. The optical splitter 20 has a splitter attenuation, SA, in a direction through the splitter from the monitoring port 16 towards the optical path 12. The attacking optical signal has an optical signal power, PJ.

In order to prevent a substantial part of the attacking optical signal being transmitted to the optical path 12 the optical isolation apparatus 22 is arranged to have an attenuation IA≥PJ−S−SA−RL+XT. The optical signal powers, S and PJ, are expressed in dBm and the attenuations, IA and SA, return loss, RL, and the cross-talk, XT, are expressed in dB.

A ninth embodiment of the invention provides a communication network element having the same structure as shown in FIG. 5 or FIG. 6, with the following modifications. The communication network element of this embodiment will be described with reference to those Figures.

In this embodiment, the optical isolation apparatus 22 has an attenuation of at least 30 dB.

A tenth embodiment of the invention provides a communication network element having the same structure as shown in FIG. 5 or FIG. 6, with the following modifications. The communication network element of this embodiment will be described with reference to those Figures.

In this embodiment, the optical communication signal 14 is a wavelength division multiplexed, WDM, signal comprising a plurality of optical communication signal channels each having a different wavelength.

S is the average optical signal power per channel of the optical communication signal at a point on the optical path 12 just after the input port 64. At the same point on the optical path, an attacking optical signal propagating towards the input port will have an optical signal power $$PJ^-=PJ-IA-SA$$

The input port connector 64 will reflect a part of the attacking optical signal, creating an attacking optical signal propagating in the other direction, that is co-propagating with the optical communication signal 14, which will have an optical signal power $$PJ^+=PJ^--RL$$

The optical jamming attack will be successful if the optical power of co-propagating attacking optical signal is high enough to cause intra-channel cross-talk which is higher than the maximum tolerable cross-talk, XT, of the optical communication signal, that is:

$$PJ^+>S-XT$$

$$PJ^--RL>S-XT$$

$$PJ-IA-SA>S-XT$$

which may be rearranged to determine that in order to prevent an optical jamming attack the optical isolation apparatus attenuation must meet the condition:

$$IA≥PJ-SA-RL-S+XT$$

For example, a typical maximum tolerable cross-talk, XT, for an optical communication signal is 15 dB, a typical value for the splitter attenuation, SA, is 20 dB, and a typical return loss, RL, is 45 dB. For a WDM optical communication signal having an optical signal power of −25 dBm per WDM channel, this may be rewritten as $$IA \geq PJ-20-45-(-25)+15$$

$$IA \geq PJ-25$$

In this condition, if the attacking optical signal has a signal power, PJ, of 30 dBm the optical communication signal will be corrupted unless at least 5 dB isolator attenuation is provided. If the return loss, RL, is lower, for example 35 dB, the isolator attenuation needs to be at least 15 dB. In both cases, using an isolation apparatus having an attenuation of at least 40 dB, the optical power, PJ⁺, of the co-propagating attacking optical signal will only be large enough to corrupt the optical communication signal if the attacking optical signal 24 is launched into the monitoring port 16 with an optical signal power, PJ, of 65 dBm, i.e. 2 kW, at which level the optical components of at least the monitoring port would be melted, thereby blocking the jamming attack.

Figure 7:
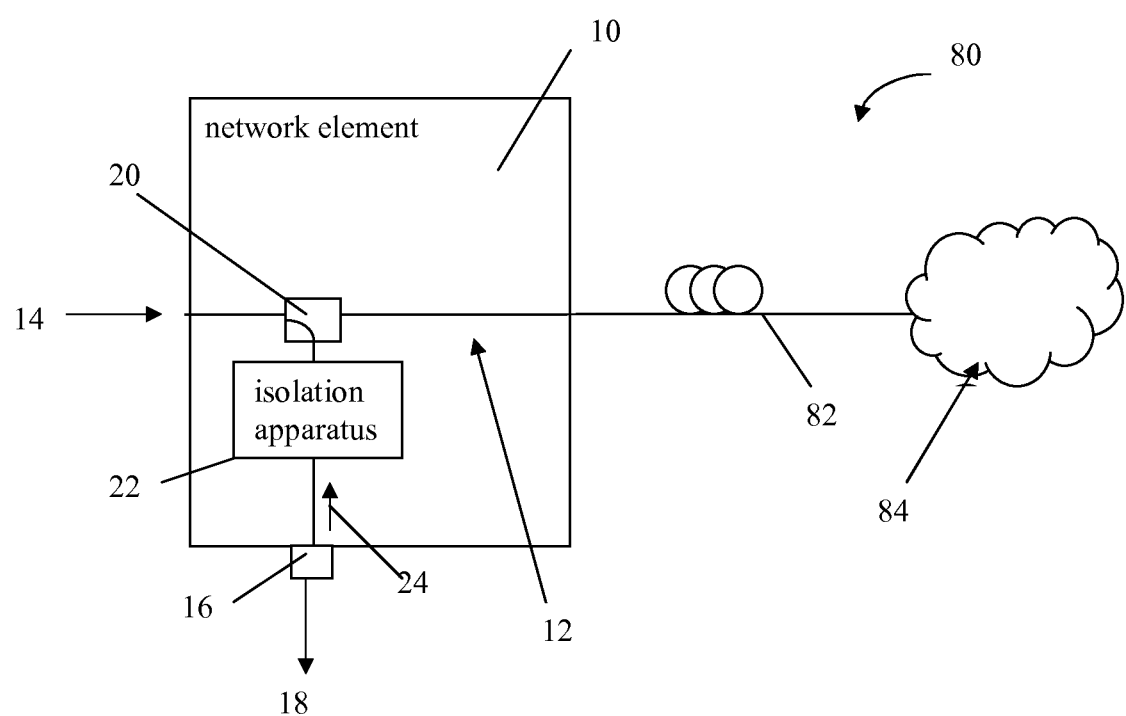
FIG. 7 is a schematic representation of a communication network according to an eleventh embodiment of the invention.

FIG. 7 shows an optical communication network 80 according to an eleventh embodiment of the invention.

The network 80 comprises an optical link 82 and a communication network element 10, as described above. The rest of the network 80 is represented schematically in FIG. 7 by a cloud 84.

It will be appreciated that any of the communication network elements 10, 30, 40, 50, 60, 70 may be used.

Figure 8:
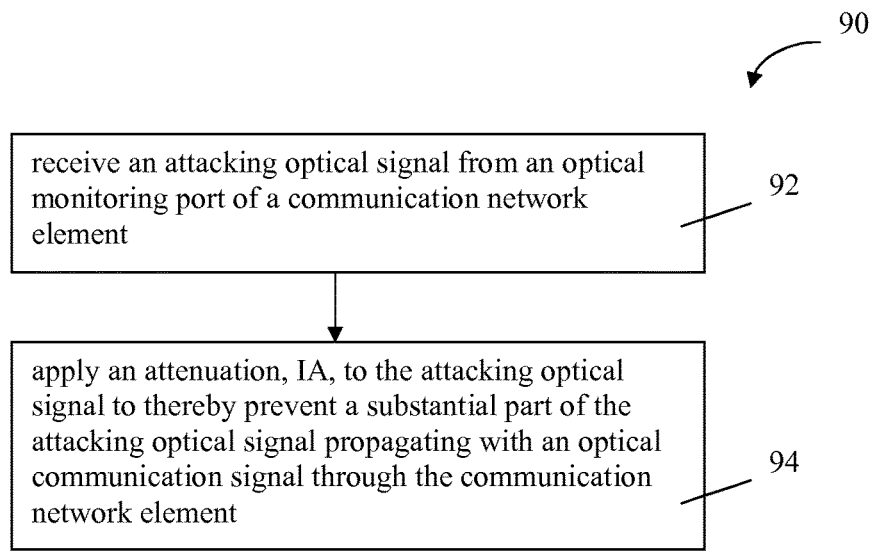
FIG. 8 shows the steps of a method according to a twelfth embodiment of the invention of mitigating an optical jamming attack against an optical communication signal through an optical monitoring port of a communication network element.

Referring to FIG. 8, a twelfth embodiment of the invention provides a method 90 of mitigating an optical jamming attack against an optical communication signal through an optical monitoring port of a communication network element.

The method 90 comprises receiving an attacking optical signal from the monitoring port 92 and applying an attenuation, IA, to the attacking optical signal to thereby prevent a substantial part of the attacking optical signal propagating with the optical communication signal 94.

Figure 9:
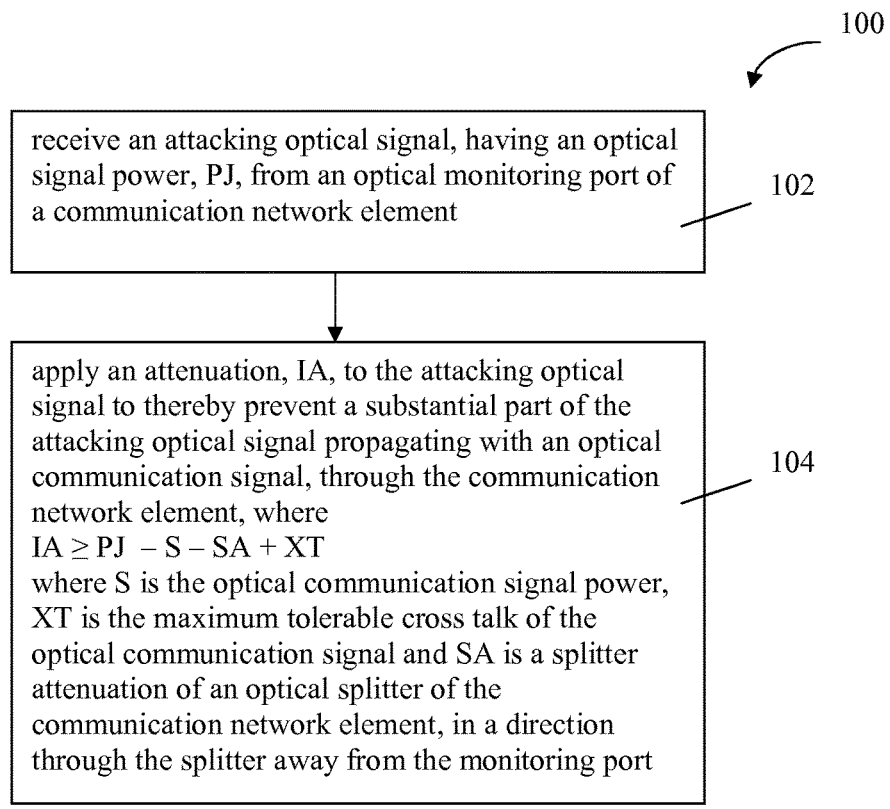
FIG. 9 shows the steps of a method according to a thirteenth embodiment of the invention of mitigating an optical jamming attack against an optical communication signal through an optical monitoring port of a communication network element.

Referring to FIG. 9, a thirteenth embodiment of the invention provides a method 100 of mitigating an optical jamming attack against an optical communication signal through an optical monitoring port of a communication network element.

The optical communication signal has an optical signal power, S, and is configured to tolerate a maximum cross-talk, XT. The communication network element comprises an optical splitter having a splitter attenuation, SA, in a direction through the splitter away from the monitoring port.

The method 100 comprises receiving an attacking optical having an optical signal power, PJ, from the monitoring port 102. The method further comprises applying an attenuation IA≥PJ−S−SA+XT, where the optical signal powers, S and PJ, are expressed in dBm and the attenuations, IA and SA, and the cross-talk, XT, are expressed in dB.

Figure 10:
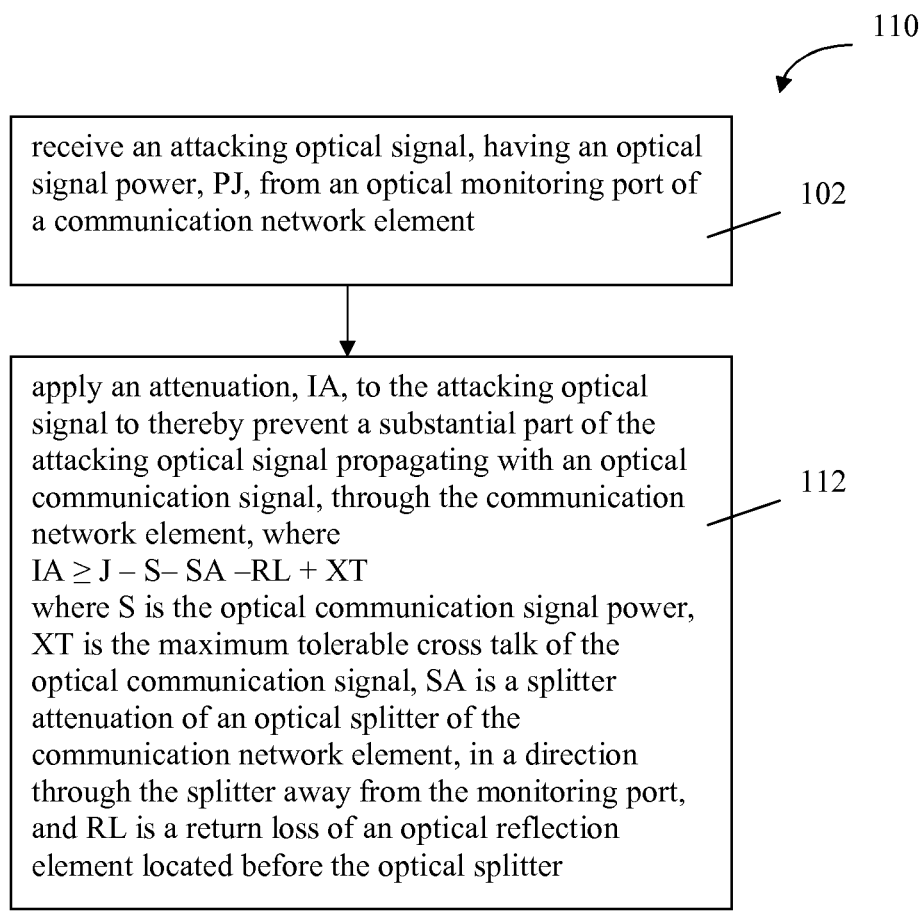
FIG. 10 shows the steps of a method according to a fourteenth embodiment of the invention of mitigating an optical jamming attack against an optical communication signal through an optical monitoring port of a communication network element.

Referring to FIG. 10, a fourteenth embodiment of the invention provides a method 110 of mitigating an optical jamming attack against an optical communication signal through an optical monitoring port of a communication network element. The method 110 of this embodiment is similar to the method 100 of the previous embodiment, with the following modifications. The same reference numbers are retained for corresponding steps.

In this embodiment, the communication network element comprises an optical reflection element before the optical splitter in a direction of transmission of the optical communication signal. The optical reflection element has a return loss, RL. The method 110 comprises applying an attenuation IA≥PJ−S−SA−RL+XT, where the return loss is expressed in dB.

Figure 11:
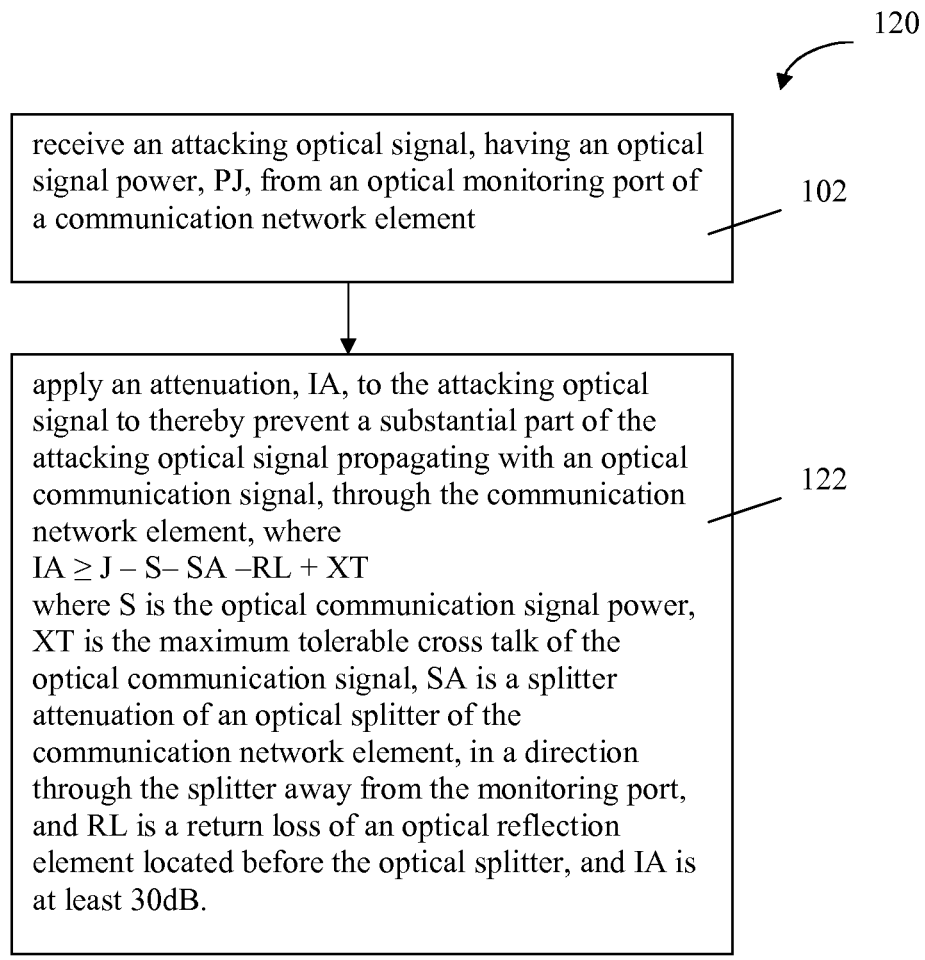
FIG. 11 shows the steps of a method according to a fifteenth embodiment of the invention of mitigating an optical jamming attack against an optical communication signal through an optical monitoring port of a communication network element.

Referring to FIG. 11, a fifteenth embodiment of the invention provides a method 120 of mitigating an optical jamming attack against an optical communication signal through an optical monitoring port of a communication network element. The method 120 of this embodiment is similar to the method 110 of the previous embodiment, with the following modifications. The same reference numbers are retained for corresponding steps.

In this embodiment, the method comprises applying an attenuation 122 of at least 30 dB.

Figure 12:
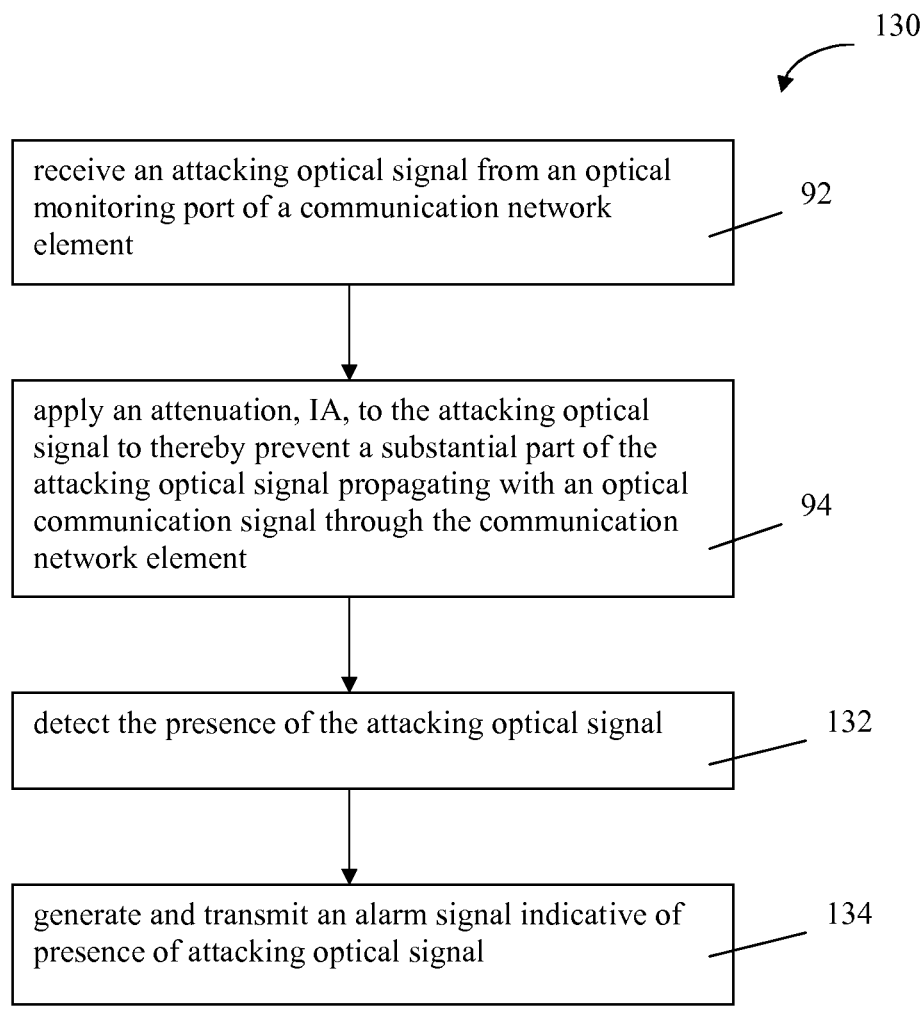
FIG. 12 shows the steps of a method according to a sixteenth embodiment of the invention of mitigating an optical jamming attack against an optical communication signal through an optical monitoring port of a communication network element.

Referring to FIG. 12, a sixteenth embodiment of the invention provides a method 130 of mitigating an optical jamming attack against an optical communication signal through an optical monitoring port of a communication network element. The method 130 of this embodiment is similar to the method 90 shown in FIG. 8, with the following modifications. The same reference numbers are retained for corresponding steps.

In this embodiment, the method further comprises detecting the presence of the attacking optical signal 132 and generating and transmitting an alarm signal following detection of the attacking optical signal 134.

A seventeenth embodiment of the invention provides a data carrier having computer readable instructions embodied therein. The computer readable instructions are for providing access to resources available on a processor. The computer readable instructions comprising instructions to cause the processor to perform any of the steps of the method 90, 100, 110, 120, 130 of mitigating an optical jamming attack against an optical communication signal through an optical monitoring port of a communication network element as described above.

Figure 13:
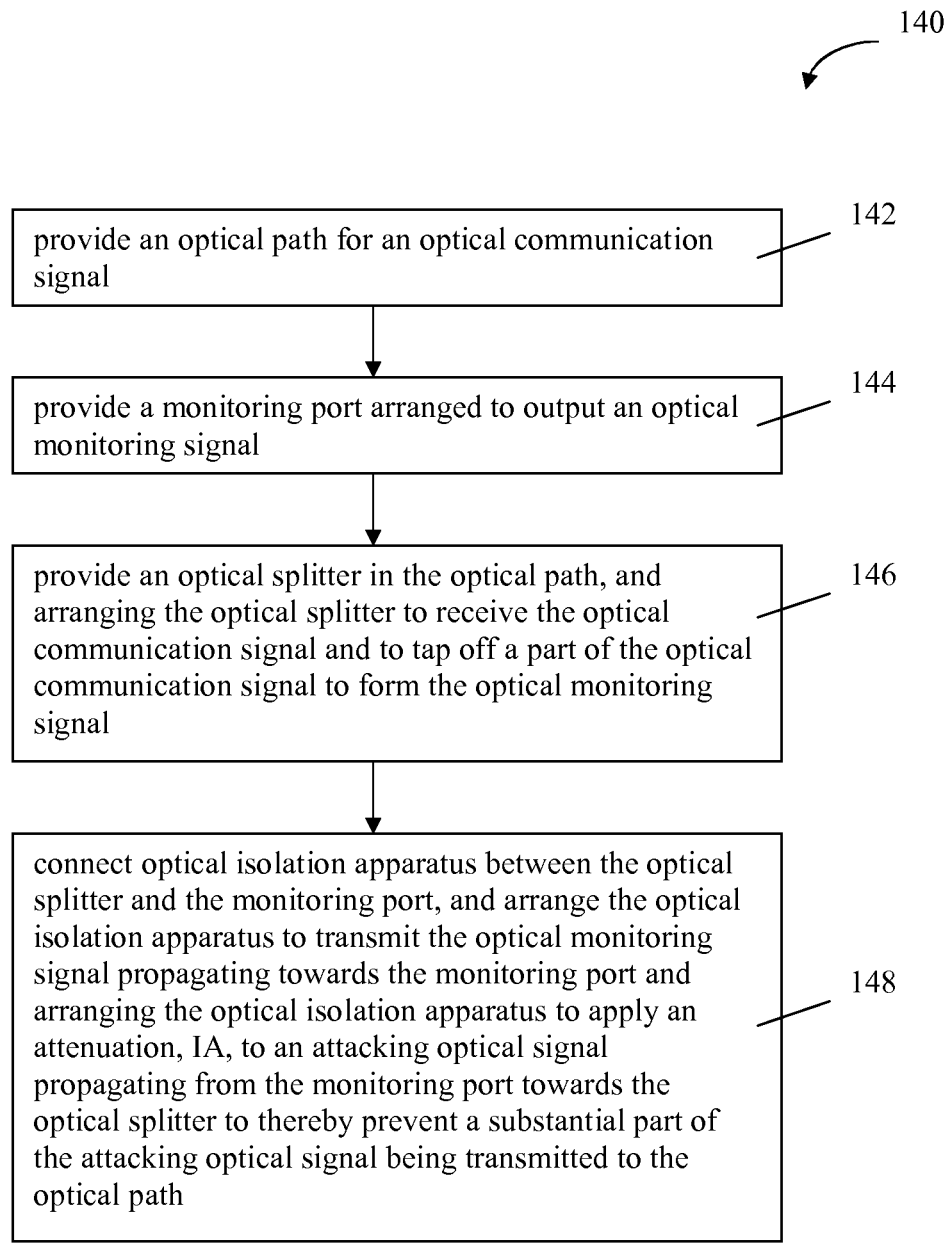
FIG. 13 shows the steps of a method according to an eighteenth embodiment of the invention of manufacturing a communication network element.

Referring to FIG. 13, an eighteenth embodiment of the invention provides a method 140 of manufacturing a communication network element.

The method 140 comprises:
providing an optical path for an optical communication signal 142;
providing a monitoring port arranged to output an optical monitoring signal 144;
providing an optical splitter in the optical path, and arranging the optical splitter to receive the optical communication signal and to split off a part of the optical communication signal to form the optical monitoring signal 146; and
connecting optical isolation apparatus between the optical splitter and the monitoring port, and arranging the optical isolation apparatus to transmit the optical monitoring signal propagating towards the monitoring port and arranging the optical isolation apparatus to apply an attenuation, IA, to an attacking optical signal propagating from the monitoring port towards the optical splitter to thereby prevent a substantial part of the attacking optical signal being transmitted to the optical path 148.

The invention claimed is:

1. A communication network element comprising:
an optical path for an optical communication signal;
a monitoring port arranged to output an optical monitoring signal;

an optical splitter provided in the optical path, the optical splitter arranged to receive the optical communication signal and to split off a part of the optical communication signal to form the optical monitoring signal;

optical isolation apparatus connected between the optical splitter and the monitoring port, the optical isolation apparatus arranged to transmit the optical monitoring signal propagating towards the monitoring port and arranged to apply an attenuation, IA, to an attacking optical signal propagating from the monitoring port towards the optical splitter to thereby prevent a substantial part of the attacking optical signal being transmitted to the optical path; and wherein:
the optical isolation apparatus comprises an optical circulator and a photodetector;
the photodetector is configured to detect the presence of the attacking optical signal;
the optical circulator comprises three input-output ports:
a first port connected to the optical splitter;
a second port connected to the monitoring port; and
a third port connected to the photodetector;
an optical signal received at the first port is output at the second port and an optical signal received at the second port is output at the third port.

2. A communication network element as claimed in claim 1, wherein the optical communication signal has an optical signal power, S, and is configured to tolerate a maximum cross-talk, XT, the optical splitter has a splitter attenuation, SA, in a direction through the splitter from the monitoring port towards the optical path, and the attacking optical signal has an optical signal power, PJ,
and wherein IA≥PJ−S−SA+XT, where the optical signal powers, S and PJ, are expressed in dBm and the attenuations, IA and SA, and the cross-talk, XT, are expressed in dB.

3. A communication network element as claimed in claim 2, wherein the optical path comprises an optical reflection element before the optical splitter in a direction of transmission of the optical communication signal, the optical reflection element having a return loss, RL, and wherein
IA≥PJ−S−SA−RL+XT, where the return loss is expressed in dB.

4. A communication network element as claimed in claim 1, wherein the optical isolation apparatus attenuation, IA, is at least 30 dB.

5. A communication network element as claimed in claim 1 wherein the photodetector is configured to generate and transmit an alarm signal following detection of the attacking optical signal.

6. A communication network element as claimed in claim 1, wherein the optical path comprises at least two of an input port, an output port and optical signal processing apparatus and wherein the optical splitter is provided between two of the input port, the output port and the optical signal processing apparatus.

7. A communication network comprising an optical link and a communication network element comprising:
an optical path for an optical communication signal;
a monitoring port arranged to output an optical monitoring signal;
an optical splitter provided in the optical path, the optical splitter arranged to receive the optical communication signal and to split off a part of the optical communication signal to form the optical monitoring signal;
optical isolation apparatus connected between the optical splitter and the monitoring port, the optical isolation apparatus arranged to transmit the optical monitoring signal propagating towards the monitoring port and arranged to apply an attenuation, IA, to an attacking optical signal propagating from the monitoring port; and wherein:
the optical isolation apparatus comprises an optical circulator and a photodetector;
the photodetector is configured to detect the presence of the attacking optical signal;
the optical circulator comprises three input-output ports:
a first port connected to the optical splitter;
a second port connected to the monitoring port; and
a third port connected to the photodetector;
an optical signal received at the first port is output at the second port and an optical signal received at the second port is output at the third port.

8. A method of mitigating an optical jamming attack against an optical communication signal through an optical monitoring port of a communication network element, the method comprising:
receiving an optical communication signal at a communication network element, the communication network element comprising:
an optical splitter;
an optical monitoring port;
the optical isolation apparatus comprises an optical circulator and a photodetector;
the optical circulator comprises three input-output ports:
a first port connected to the optical splitter;
a second port connected to the optical monitoring port; and
a third port connected to the photodetector;
transmitting a portion of the received optical communication signal from the optical splitter to the first port of the optical circulator;
transmitting the portion of the received optical communication signal out the second port of the optical splitter to the optical monitoring port;
receiving an attacking optical signal from the monitoring port at the second port of the optical circulator;
applying, by the optical circulator, an attenuation, IA to the attacking optical signal to thereby prevent a substantial part of the attacking optical signal propagating with the optical communication signal; and
transmitting the attacking optical signal out the third port of the optical circulator to the photodetector.

9. A method as claimed in claim 8, wherein the optical communication signal has an optical signal power, S, and is configured to tolerate a maximum cross-talk, XT, the optical splitter having a splitter attenuation, SA, in a direction through the splitter away from the monitoring port, and the attacking optical signal has an optical signal power, PJ, and wherein the method comprises applying an attenuation IA≥PJ−S−SA+XT, where the optical signal powers, S and PJ, are expressed in dBm and the attenuations, IA and SA, and the cross-talk, XT, are expressed in dB.

10. A method as claimed in claim 9, wherein the communication network element comprises an optical reflection element before the optical splitter in a direction of transmission of the optical communication signal, the optical reflection element having a return loss, RL, and wherein the method comprises applying an attenuation IA≥PJ−S−SA−RL+XT, where the return loss is expressed in dB.

11. A method as claimed in claim 8, wherein the attenuation, IA, is at least 30 dB.

12. A method as claimed in claim 8, wherein the method further comprises detecting the presence of the attacking optical signal by the photodetector and generating and transmitting an alarm signal following detection of the attacking optical signal.

13. A method of manufacturing a communication network element, the method comprising:
- providing an optical path for an optical communication signal;
- providing a monitoring port arranged to output an optical monitoring signal; providing an optical splitter in the optical path, and arranging the optical splitter to receive the optical communication signal and to split off a part of the optical communication signal to form the optical monitoring signal; and
- connecting optical isolation apparatus between the optical splitter and the monitoring port, and arranging the optical isolation apparatus to transmit the optical monitoring signal propagating towards the monitoring port and arranging the optical isolation apparatus to apply an attenuation, IA, to an attacking optical signal propagating from the monitoring port towards the optical splitter to thereby prevent a substantial part of the attacking optical signal being transmitted to the optical path; and wherein:
- the optical isolation apparatus comprises an optical circulator and a photodetector configured to detect the presence of the attacking optical signal;
- the optical circulator comprises three input-output ports; and
- connecting the optical isolation apparatus between the optical splitter and the monitoring port comprises:
  - connecting a first port of the optical circulator to the optical splitter;
  - connecting a second port of the optical circulator to the monitoring port; and
  - connecting a third port of the optical circulator to the photodetector; and
- the optical circulator is configured such that an optical signal received at the first port is output at the second port and an optical signal received at the second port is output at the third port.

\* \* \* \* \*